US012773853B2

(12) United States Patent
Cervieri Concatto et al.

(10) Patent No.: US 12,773,853 B2
(45) Date of Patent: Oct. 27, 2026

(54) SYSTEM AND METHOD FOR MANUFACTURING LABELS WITH VARIABLE INFORMATION PRINTED BY THERMAL TRANSFER

(71) Applicant: TECHNOPACK IND. COM. CONSULTORIA E REPRESENTAÇÕES LTDA, Cachoeirinha (BR)

(72) Inventors: Daniel Cervieri Concatto, Porto Alegre (BR); Leandro Nowicki, Eldorado do Sul (BR); Patricia Ullmann Duarte Antoniuk, Porto Alegre (BR); Pedro Henrique De Moura Leal, Porto Alegre (BR); Jose Valmir De Moraes, Gravatai (BR)

(73) Assignee: TECHNOPACK IND. COM. CONSULTORIA E REPRESENTAÇÕES LTDA, Cachoeirinha (BR)

( * ) Notice: Subject to any disclaimer, the term of this patent is extended or adjusted under 35 U.S.C. 154(b) by 514 days.

(21) Appl. No.: 18/267,575

(22) PCT Filed: Oct. 8, 2021

(86) PCT No.: PCT/BR2021/050439
§ 371 (c)(1),
(2) Date: Jun. 15, 2023

(87) PCT Pub. No.: WO2022/126213
PCT Pub. Date: Jun. 23, 2022

(65) Prior Publication Data
US 2024/0059078 A1 Feb. 22, 2024

(30) Foreign Application Priority Data
Dec. 18, 2020 (BR) .......................... 10 2020 026109

(51) Int. Cl.
*B41J 2/325* (2006.01)
*B31D 1/02* (2006.01)
(Continued)

(52) U.S. Cl.
CPC ................ *B41J 2/325* (2013.01); *B31D 1/02* (2013.01); *B32B 27/32* (2013.01); *B41J 2/315* (2013.01); *B41M 7/02* (2013.01)

(58) Field of Classification Search
CPC . B41J 2/325; B41J 2/315; B41M 7/02; B31D 1/02; B32B 27/32
See application file for complete search history.

(56) References Cited

U.S. PATENT DOCUMENTS 7,588,812 B1 9/2009 Patel et al.
2005/0281989 A1* 12/2005 Finger ...................... B41M 5/42 428/195.1

(Continued)

FOREIGN PATENT DOCUMENTS

BR 102015018906 A2 2/2017
WO 2009011757 A2 1/2009
WO 2019241431 A1 12/2019

*Primary Examiner* — Henok D Legesse
(74) *Attorney, Agent, or Firm* — Berg Hill Greenleaf & Ruscitti LLP

(57) ABSTRACT

The present invention pertains to the technical field of packaging and relates to a system and a method for manufacturing labels with variable information printed by thermal transfer. A method is provided comprising the steps of supplying a support strip comprising a substrate and a release coat; applying and drying a layer of protective varnish; applying and drying at least one identification layer, forming at least one label; printing variable information on each label by thermal transfer; applying and drying a layer of adhesive varnish. The protective varnish is a copolyester varnish, and the thermal transfer takes place at a temperature of 30° C. or less. A system capable of implementing said
(Continued)

Figure 1:
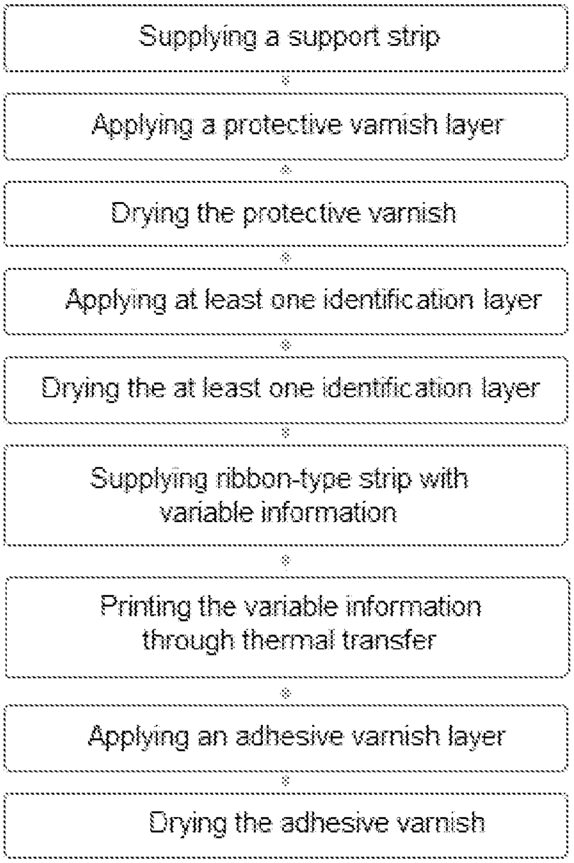

method is also provided. The proposed solution makes it possible to obtain high printing speeds on the line for producing strips comprising weather-resistant labels.

14 Claims, 3 Drawing Sheets

(51) Int. Cl.

| | |
|---|---|
| ***B32B 27/32*** | (2006.01) |
| ***B41J 2/315*** | (2006.01) |
| ***B41M 7/02*** | (2006.01) |

(56) References Cited

U.S. PATENT DOCUMENTS

| | | | | |
|---|---|---|---|---|
| 2007/0275319 | A1 | 11/2007 | He et al. | |
| 2018/0326772 | A1 | 11/2018 | Fukunaga | |
| 2019/0153267 | A1 | 5/2019 | Munnelly et al. | |
| 2019/0383649 | A1* | 12/2019 | Abdo | B41M 5/40 |

* cited by examiner

SYSTEM AND METHOD FOR MANUFACTURING LABELS WITH VARIABLE INFORMATION PRINTED BY THERMAL TRANSFER

CROSS-REFERENCE TO RELATED APPLICATION

This application is a national stage application under 35 U.S.C. 371 of PCT Application No. PCT/BR21/50439 having an international filing date of Oct. 8, 2021, which designated the United States, which PCT application claimed the benefit of Brazil application Ser. No. 10/202, 0026109-6, filed Dec. 18, 2020, both of which are incorporated by reference in their entirety. #

TECHNOLOGICAL SECTOR OF THE INVENTION

The present invention pertains to the technical field of packaging, more specifically, a manufacturing system and method for manufacturing labels with variable information. The information printed by thermal transfer allows high-speed production of strips containing labels with individual information for each product, ensuring the integrity and abrasion resistance of the product. Specifically, it addresses the manufacturing system and method for manufacturing with variable information printed by thermal transfer.

STATE OF THE ART

In the packaging industry, a trend has been noted, with removable paper/plastic labels being gradually replaced by self-adhesive films, particularly in packs in direct contact with water, such as shampoos, detergents, and cleaning products. In addition to a better appearance, they offer greater resistance against weathering. This application is of particular interest in the reusable packaging industry, where maintaining the integrity of not only the container, but also the label, can lead to significant reductions in manufacturing costs.

Self-adhesive films have higher resistance and may have the same useful life as the product and the recipient on which they are printed. Furthermore, they have excellent graphic resolution and costs close to those of paper labels. They also allow the printing of several overlapping layers to obtain particular technical effects.

In the context of reusable packaging, there is much interest in obtaining labels that, in addition to being resistant to multiple uses of a product, underpin the traceability of the history of the reusable packaging, making it easy to obtain accurate information, such as origin, number of reuses, and the remaining useful life of a specific recipient. Along these lines, printing individual identification codes on each bottle, without adversely affecting production speed, print quality, and resistance to weathering of the label, is a challenge faced by the packaging industry today. Consequently, it is possible to list technologies for manufacturing labels with variable information.

The following patent documents will be discussed: BR 102015018906-0, U.S. Pat. No. 8,647,740B2, and U.S. Pat. No. 7,588,812.

Document BR102015018906-0, entitled “Manufacturing process for packaging labels using thermal transfer technology with sequential alpha-numerical identification codes applied thereto”, discloses the process comprising the steps of applying and drying wax on a substrate; applying and drying a layer of adhesive varnish; printing and drying ink layers on the label, compliant with customer artwork; printing the information data after the application of the ink layers; and applying and drying a protective varnish on the ink layers and information data. The technology proposed in this document adopts graphic printing of the variable information on a rotogravure press, using solvent-based ink. However, this approach to printing variable information has several limitations: for each pack to have particular information, the copper cylinders ustad in the press must be constantly adjusted, so it is hard to keep up a high production speed. In order to print variable data using only a rotogravure press, a new cylinder would have to be etched for each new turn during the printing process. This would generate cylinder demands for each production batch that are not feasible, together with constant setup adjustments to replace the cylinders. The costs of this approach would be exorbitant. The process is thus difficult to upscale, imposing constraints on printing possibilities. Furthermore, there is no mention of alternatives ensuring that the said variable information is printed without smudges or graphic flaws at high speeds.

Document U.S. Pat. No. 8,647,740B2, entitled “Thermal transfer label well-suited for labeling fabrics and methods of making and using the same”, discloses a thermal transfer label to label a fabric item, comprising: (a) a support portion that includes a carrier and a release coat; (b) a transfer portion; (i) a first printrun that comprises a polyvinyl chloride ink; (ii) a second printrun through thermal transfer that comprises a layer made with a resin- and wax-based thermal transfer strip; (iii) the heat-activated adhesive layer free to come into direct contact with the fabric item; and (v) a wax layer in direct contact with the heat-activated adhesive layer. Although using thermal transfer strips on the described label, this document indicates that the thermal transfer printing speed does not exceed 16 inches per second (0.4 m/s). It is a challenge for a person versed in the art to obtain a faster printing speed without adversely affecting the print quality and integrity of the label, whereby the step of thermal transfer printing of variable information currently constitutes a substantial production line bottleneck. Furthermore, this document is specifically adapted to the textile industry; reusable packaging labels in the beverages industry, for example, must be chemically and physically resistant to the aggressive treatments normally used to sanitize this packaging for reuse (washing with caustic soda, impacts during transportation etc.). Achieving high printing speeds on the line for producing strips comprising weather-resistant label strips thus remains a substantial challenge at the state of the art.

Document U.S. Pat. No. 7,588,812, entitled “Thermal transfer labeling system” was filed on Mar. 28, 2006 by the Registrant, Gotham Ink Corporation, and describes a thermal transfer label, a method for manufacturing a thermal transfer label, and a method for labeling containers and sheets of untreated or minimally treated polyethylene, polypropylene polymers, and polyethylene-polypropylene copolymers and sheets that are at room temperature or heated to 180 degrees Fahrenheit. This document describes a plurality of options for weather-resistant top coatings, including phenoxy lacquer resins dissolved in a combination of methylethylketone and toluene, and ethylene-vinyl acetate copolymer combinations. The document also states that the weather-resistant top coating may be eliminated by replacing it with white or colored weather-resistant ink that completely covers the heat-activated adhesive area. This document does not solve the technical problem of ensuring high printing speeds for the weather-resistant label strip production line.

Furthermore, it is noted that the systems and processes already in place at the state of the art, in the quest for labels that are more weather-resistant, frequently print labels through thermal transfer on resin-type strip ribbons, in which the printhead generates thermal signals corresponding to the information to be printed, promoting selective transfer through a ribbon, i.e. an intermediate element, to the substrate, thereby reproducing the desired information. In such systems, resin-based ink formulations may be used, known for offering greater durability and resistance, but requiring lower speeds and higher printing temperatures. On the other hand, the use of mixed wax-resin formulations or mixed wax-resin ribbon strips allows good-quality printing at higher speeds; however, the ink transferred by this type of ribbon presents lower resistance to friction and abrasion, resulting in lower durability when exposed to moisture or weathering.

It is also noted that, in order to ensure information transfer by thermal transfer printing processes, in which a printhead generates thermal signals corresponding to the information to be printed, promoting selective transfer through a ribbon, i.e. an intermediate element, to a substrate, the state of the art indicates that, in order to attain faster printing speeds with no loss of print quality, the use of higher printing temperatures is typically required. However, this is not always a feasible alternative, as high temperatures may disturb the stability of the ink, wax, and varnish layers already printed on the label, and may smudge or damage it, or reduce its durability. High-speed, good-quality thermal transfer printing of labels on ribbon-type strips without being dependent on high temperatures, is still a challenge for a person visiting the art.

There is clearly a gap in the creation of a novel system that allows fast and accurate thermal transfer printing at low temperatures of variable information by means of a thermal transfer printing process, in which a printhead generates thermal signals corresponding to the information to be printed, promoting selective transfer through a ribbon, i.e. an intermediate element, to a substrate. Such a system aims to provide resistant labels containing variable codes with high resistance to weathering that can be used in reusable packaging.

NOVELTY AND PURPOSES OF THE INVENTION

In order to remedy gaps in the current state of the art, as described above, this patent of invention is intended to provide a solution to the technical problem of enabling high-speed printing of variable codes on labels with high resistance to weathering, by means of a thermal transfer printing process in which a printhead generates thermal signals corresponding to the information to be printed, thereby promoting selective transfer through a ribbon, i.e. an intermediate element, onto a substrate. To this end, the invention describes a process for manufacturing labels for packaging using heat transfer technology, in which variable codes are applied between and/or under layers of inks and varnishes, so that each label has a unique identification. The unique identification enables the recording and retrieval of information related to the manufacturing process, allowing traceability of the labels throughout the production process. In addition, the invention enables monitoring of the life cycle of reusable packaging, including control of the number of uses of each package, as well as assessment of parameters related to print quality, label durability, and package integrity. It is further believed that this innovation will provide greater control over process capability and more accurate control of packaging obsolescence. The technology will enable individual and dedicated monitoring of the product, evaluating it throughout its entire useful life, from the manufacturing process until its return for reuse.

The purpose of the present invention is a manufacturing process for labels on cylindrical printing presses, with variable information printed by thermal transfer, comprising the following steps:

- providing a support strip comprising a substrate and a release coat arrayed on the substrate surface;
- applying a layer of protective varnish on the support strip;
- drying the protective varnish layer;
- applying at least one identification layer on a region of the protective varnish layer, forming at least one label;
- drying the at least one identification layer of the at least one label;
- providing a strip-type ribbon for thermal transfer printing of variable information on each label on the said strips containing labels;
- printing variable information on each label through thermal transfer;
- applying a layer of adhesive varnish on the preceding layers;
- drying the adhesive varnish layer;

wherein said protective varnish is a copolyester varnish; the said printing of variable information takes place through thermal transfer at a temperature of or below 30° C.; and the printing speed of the strips containing labels is between 0.25 and 1.2 m/s.

Preferably, the said adhesive varnish layer has a thickness of 1 to 5 microns. Preferably, the printing is performed by a rotogravure press. Preferably, the said release coat is a polyethylene wax with a melting temperature ($T_m$) between 58° C. and 95° C.

Preferably, the said thermal transfer printing is performed by means of the action of at least one printhead on an intermediate transfer element, the printhead generating thermal signals corresponding to the information to be printed, thereby promoting selective transfer through an intermediate ribbon to at least one of the labels. Preferably, the printhead is reconfigured between successive printings so as to enable the printing of different variable information on each label. Optionally, the method also comprises the application of at least one additional identification layer before applying the adhesive varnish layer. Optionally, the identification layer before applying the variable code serves as a guide for the printhead to transfer the variable label. Preferably, the said variable information is the identification code of a Data Matrix or QR Code type label. Optionally, the said drying of the protective varnish layer, drying of at least one identification layer, and drying the adhesive varnish layer takes place in the kilns positioned downstream from the corresponding printheads, with temperatures set between 52° C. and 65° C.

Another purpose of the present invention manufacturing a system for manufacturing labels on a rotary matrix, comprising printing of variable information by thermal transfer between rotary printing layers, wherein a printhead generates thermal signals corresponding to the information to be printed, thereby promoting selective transfer through a ribbon, i.e. an intermediate element, to a substrate, comprising:

- protection application module;
- identity module;

thermal transfer module;

adhesive application module;

wherein the said identity module is connected downstream from the protection application module; wherein the said thermal transfer module is connected downstream from the identity module; wherein the said adhesive application module is connected downstream from the thermal transfer module; wherein a support strip comprising a substrate and a release coat arrayed on the surface of the said substrate is received in the protection application module, wherein the applying and drying takes place of a layer of protective varnish; wherein the support strip then continues to the identity module, wherein the applying and drying takes place of at least one identification layer on the protective varnish layer, forming at least one label; wherein the support strip then continues to the thermal transfer module, wherein the variable information is printed on each label as from the a strip-type ribbon, guided by the positioning of the identification layer; wherein the support strip then continues to the adhesive application module, wherein the applying and drying takes place of at least a layer of adhesive varnish on the preceding layers; said protective varnish is a copolyester varnish; wherein the said printing of variable information is performed at a temperature of or below 30° C.; and the printing speed of the strips containing labels is between 0.25 and 1.2 m/s.

Preferably, the system also comprises a second identity module between the thermal transfer module and the adhesive application module, wherein at least one additional identification layer is applied to each label, before applying the adhesive varnish layer. Optionally, the said drying of the protective varnish layer, drying the at least one identification layer, and drying the adhesive varnish layer takes place in kilns positioned downstream from the corresponding printheads, with temperature settings between 52° C. and 65° C.

The proposed solution was prompted by the inventors noting that the use of a wax-resin strip-type ribbon with one protective copolyester varnish allows the printing of variable information (preferably, a two-dimensional code, such as a Data Matrix or QR Code, for example) at high speeds and low temperatures, maintaining good print quality and scuff resistance. Scuff resistance, particularly rubbing and chemical agents, may be viewed as a particularly important problem for the reusable packaging sector because, once discarded, they run through a plurality of processes (particularly disinfection) in order to make them reusable, whereby the label passed be resistant, remaining complete and legible. Striving to obtain a scuff-resistant label for application to recyclable packaging, it was noted that the resin ribbon-type strips, which are typically considered more resistant, did not allow high printing speeds with no significant adverse effects on print quality.

In the quest to develop a high resistance strips containing labels production process that could handle high printing speeds, to apply a protective varnish that would endow the strips containing labels in question with satisfactory adherence and print quality. Finally, the process addressed by the present invention was obtained, which uses protective copolyester varnishes, allowing thermal transfer printing of ribbons at low temperatures and high speeds, without harming label integrity.

The sequence of steps used in the present invention also offers countless other technical advantages. Wax-resin printing at low temperatures on the protective copolyester varnish allows the use of release coats with lower melting temperatures ($T_m$) on the support strip, preferably between 58° C. and 95° C., without adversely affecting the quality of the end product. In turn, a release coat with a lower $T_m$ allows a subsequent label printing process on the packaging, thus extending its application to packs with materials that are more temperature-sensitive, while lowering the energy costs of the process.

It was also noted that, in addition to allowing the use of release coats with lower $T_m$. The present invention also allows the application of an adhesive varnish layer with a satisfactorily fine thickness, in the range of 1 to 5 microns. This is because, as the label printing process uses lower temperatures and the release coat used may have a lower $T_m$, the subsequent attachment of the label to the bottle Is easier. A finer adhesive varnish layer leads to feedstock savings over the long term.

Thermal transfer printing from the ribbon to the label is performed on the protective varnish (or an identification layer), not being applied directly to the release coat, reducing the occurrence of damage to the release coat or the support strip. It is also stressed that low-temperature thermal transfers avoid early wear on the printhead.

DESCRIPTION OF THE APPENDED DRAWINGS

For the present invention to be fully understood and materialized by any person versed in this technological sector, it will be described clearly, concisely, and sufficiently, based on the appended drawings, which illustrate and provide input, as listed below:

FIG. 1 presents a diagram of the steps of the claimed method.

Figure 2:
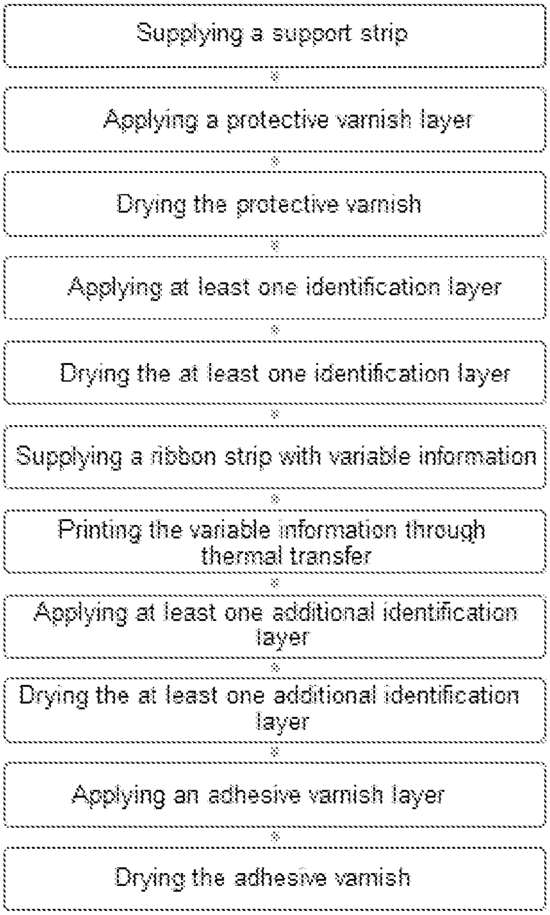

FIG. 2 presents an alternative diagram of the steps of the claimed method, comprised of applying and drying an additional identification layer.

Figure 3:
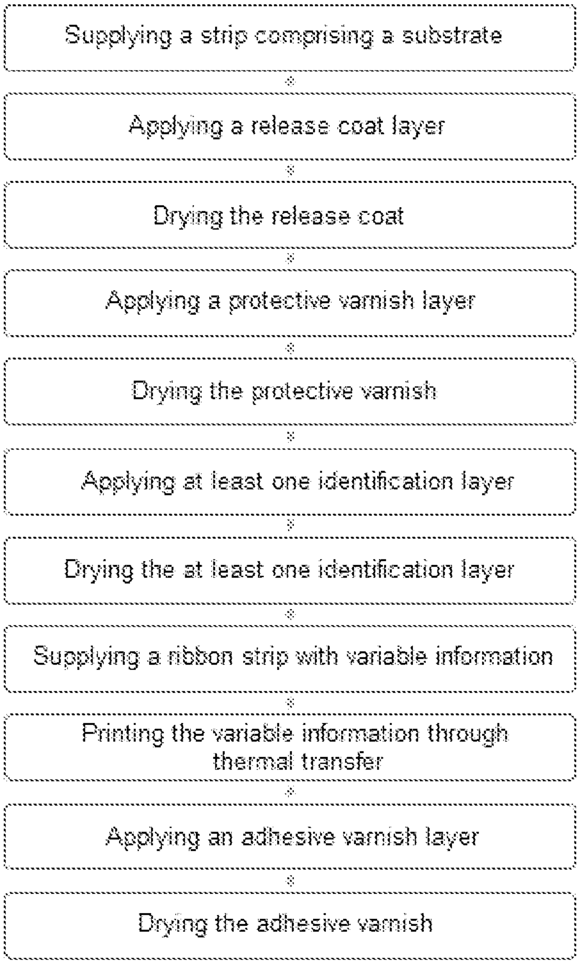

FIG. 3 presents a diagram of the claimed method, including the step of applying and drying the release coat on the substrate.

DETAILED DESCRIPTION OF THE INVENTION

The process and system described in the present invention through the initial steps encompass a support strip comprising a substrate and a release coat arrayed on the substrate surface. The substrate may be paper, preferably with a gram weight of between 40 and 70 g/$m^2$, and more preferably between 42 and 60 g/$m^2$ and even more preferably between 42 and 57 g/$m^2$, or polymer film, preferably with a thickness between 12 and 40 μm. The support strip may be any length between 1 and 1500 m.

Preferably, the release coat has a thickness between 2 and 7 microns. The gram weight used may be between 1.75 g/$m^2$ and 3.00 g/$m^2$. Optionally, the release coat base may be selected from carnauba wax, beeswax, polyester, polyamide, polyethylene, or any combination thereof, and may be diluted in a solvent selected from among isopropanol, petroleum naphtha, ethanol; toluene; and benzene, or any combination thereof. The release coat may have a melting point between 58° C. and 95° C., preferably between 58° C. and 87° C., preferably between 78° C. and 84° C. It may present solids content levels of between 15% and 50%, preferably between 18% and 40%, more preferably between 20% and 30%. Examples of this varnish are WPD2-0W5U NexisCode PRE OTG Release Coating, sold by the Flint Group and HR24153 sold by Sun Chemical, in the DIC Group.

In one embodiment, the step of providing support strip comprising a substrate and a release coat comprises: providing the support strip comprising a substrate; depositing a release coat on the said substrate through rotogravure or flexography, preferably rotogravure; and drying the said release coat. The drying process may take place in kilns positioned downstream from the release coat printhead, with the use of temperature. The kiln temperatures are preferably set between 52° C. and 65° C. In another embodiment, the support strip is acquired with the substrate and release coat already in place.

The protective varnish is deposited on the release coat layer on the support strip, with the copolyester varnish, preferably transparent, protecting the layers printed subsequently through mechanical and chemical means, with stronger chemical protection against alkaline substances. The selected varnish may present solids content levels between 15% and 40%, preferably between 18% and 30%, and more preferably between 19.5% and 23%. An example of this varnish is WPD2-0W8U NexisCode TOP OTG Protective Coating sold by the Flint Group. This varnish preferably has a thickness between 1 and 5 microns, and greater thicknesses may be used optionally, if greater resistance is required. The gram weight used may be between 1.75 g/$m^2$ and 3.00 g/$m^2$ Next, at least one identification layer is applied to a region of the protective varnish layer. The at least one identification layer may cover all or part of the protective varnish. In one embodiment, the identification layer may be modified vinyl ink. In one embodiment, the identification layer covers the region where the variable information will subsequently be printed, and may offer greater contrast for easier subsequent reading of the said variable information. In another embodiment, the identification layer does not cover the region where the said variable information will be printed, with the said variable information deposited directly on the protective varnish. Preferably, the at least one identification layer will serve as a guide for indicating the positioning of the thermal transfer printhead (ribbon). This indication may be performed through a photocell sensor or equivalent. The layers are preferably printed on the label "internally", in other words, the identification layers will be positioned facing the backing, mirroring the array order on the finished product, as the backing is removed during the process of applying the label to the product. The layers are thus printed out in order, from the outer layer to the inner layer. The plurality of modules for printing the identification layers may be used, in series or in parallel, for example, 5 to 15 modules.

In one embodiment, the at least one identification layer is merely a background, preferably monochrome, on which the variable information will be printed. This embodiment gives rise to identification labels that may be applied to the plurality of packs. In another embodiment, the at least one identification layer forms a complete product identification label, setting aside an area for printing the variable information. In one embodiment, the at least one identification layer comprises a signaler for a photocell sensor, with this signaler serving as a guide for printing the variable information, whereby the said variable information is printed on either the said identification layer or directly onto the protective varnish, and the said identification layer may be fully or partially left on the label when applied to packaging. In one embodiment, the identification layer includes printed artwork that may be used as a reference for identifying the position of the label on the reel. In one embodiment, the application equipment handles the position identification of the label on the reel through the support strip characteristics, with no need for a photocell or reference mark.

The next step to be performed is the variable information thermal transfer printing step, which may be intermittent or continuous. If intermittent, the support strip moves forward and pauses at alternating intervals. The printhead moves, shifting up against or along the support strip. The printhead performs the printing and returns to the initial position. The support strip and ribbon then move forward, and the process is repeated right from the start. If continuous, the support strip continues to move. When activated, the strip-type ribbon moves and reaches the speed of the film, after which the printhead moves and printing begins. At the end of the printing action, the printhead returns to the starting position, and the strip-type ribbon stops moving. The ribbon strip, or simply ribbon, are synonymous and constitute the intermediate element for ink transfer in the process. The printhead may be flat-head or near-edge, preferably near-edge. When printing the ribbon, a photocell sensor is used to coordinate the positioning of the code applied to the backing. The photocell sensor may be located alongside the thermal transfer equipment, either upstream or downstream, or even at the end of the production line, as the strip is used continuously in the process. The ribbon position may be adjusted through lengthwise control, for example through a servomotor, and/or crosswise, by adjusting the side edges. For example, a SmartDate® X60 printer may be used, manufactured by Markem-Imaje or similar. The expected print resolution is around 300 dpi.

The thermal transfer printing speed of the variable information is between 0.01 m/s and 1.2 m/s, more preferably between 0.25 and 1.2 m/s, more preferably between 0.25 and 0.9 m/s, more preferably between 0.25 and 0.75 m/s, and more preferably between 0.50 and 0.75 m/s. Very low speeds may cause problems with inks and varnishes drying on the cylinder in the intermittent mode, whereby speeds of up to 0.75 m/s are preferable.

The thermal transfer printhead is preferably comprised of a line of independent resistances mounted on a ceramic support. The resistances are activated, depending on the variable information to be printed, sensitizing the release coat on the strip-type ribbon and allowing the transfer of only the variable information to the support strip. In one embodiment, the variable information is a unique pack identification code, ensuring its traceability throughout the production chain.

It was noted that the application of the variable information through means other than thermal transfer, such as inkjet, did not form a cohesive film on the protective varnish layer. This resulted in the incorrect deposit of the adhesive varnish on the ink layer, causing gaps in the adhesion of the label to the packaging, with adverse effects on the scuff resistance of the label. On the other hand, applying the variable information through a laser device at the intended speeds caused damage to the protective varnish, with adverse effects on label durability. The process proved well adapted to occasional accumulated variations in the support strip thickness and the protective varnish, with the perforation depths varying, thus undermining the integrity of the protective varnish. Finally, thermal transfer technology using other protective agents caused smudges and gaps in the printing at the high speeds used in the present invention.

In the present invention, the application of the strip-type ribbon is possible, due to the fact that the protective copolyester varnish Drives to form a polymer film, whereby the duration of contact with the printed, although shorter, is sufficient to complete the printing. Preferably, the selected ribbon is of the wax-resin type, in order to obtain a close affinity with the protective varnish/ink on which the ribbon is printed [sic]. The resin used in the ribbon may consist of any material that allows correct attachment during the thermal transfer, for example, a polyester resin.

Preferably, the thickness of the mixed wax-resin ribbon printed on the label is equal to or less than 11 microns, but preferably, less than or equal to 7 microns, although preferably less than or equal to 4 microns.

Optionally, for high-thickness ribbons, an additional layer may be deposited of a barrier that prevents the ink from spreading, before and/or after the ribbon. However, this barrier is usually not necessary. In one embodiment, the selected strip-type ribbon may have a width of between 3 and 10 centimeters. The melting temperature of the ribbon ink material is preferably between 60° C. and 90° C., and more preferably between 60° C. and 70° C.

At least one additional identification layer may be applied after the thermal transfer printing of the variable information, as suitable for the label or the equipment, within the scope of the present invention.

The adhesive varnish is preferably a transparent copolyester varnish whose purpose is to provide anchorage for the structure that comprises the label on the pack of interest. It also has the purpose of protecting the layers printed previously through mechanical and chemical attack, with chemical protection specifically against alkaline substances. Preferably, this varnish is used with a solids content level between 15% and 40%, preferably between 16% and 25%, and more preferably between 18% and 23%. An example of this varnish is WPD2-0W7U NexisCode OTG Adhesive Coating sold by the Flint Group. The thickness of the adhesive varnish applied is preferably between 1 and 5 microns. The gram weight used may be between 1.95 g/m$^2$ and 3 g/m$^2$. It is possible to use adhesive varnish thicknesses that are thinner than those commonly used at the state of the art, as the ribbon thermal transfer process is performed at lower temperatures, making it possible to use release coats that also have lower $T_m$, making it easier to peel the label away from the backing when applied to the pack.

In one embodiment, the label obtained therefrom may be used for reusable recipients, such as returnable bottles, for example. The label addressed by the present invention is scuff-resistant and can withstand washing with caustic soda, due to the protective varnishes and copolyester adhesive. Thus, after disposal, the label will remain on the pack undamaged, allowing reusable recipients to be traced. For example, the manufacturer will be able to check how many times each specific recipient has been used, and then decide whether to use it once more or discard it. It is also possible to monitor the quality and durability of recipients made by specific manufacturers, identifying opportunities to upgrade the packs that they produce.

Optionally, the label obtained through the present invention may be used with a label that is not resistant to chemical agents. Thus, the part of the pack with the individual identification will be maintained with each new use, while part of the pack will be removed/altered, as wished by the manufacturer.

Optionally, the label obtained through the present invention may contain information on at least two different products, preferably transparent or translucent packs, whereby a single pack may be used for different products, without adversely affecting consumers, who will be able to see and correctly identify the product by sight through the transparent or translucent pack, or some means of identification other than the label.

Printing the protective varnish layers, the identification layers, and the adhesive varnish layer may be handled through flexography, rotogravure and/or silkscreen technologies, preferably rotogravure. Preferably, cylindrical printing presses are used. Preferably, the relative air humidity where the process is performed is between 10% and 90%.

Preferably, the labels produced are subsequently applied to packs under heat and pressure, with the product characterized as a thermal transfer label. Optionally, this application may be performed by an automatic labeler with a square, rectangular, or circular cross-section, among others. During the label application process, a temperature of 90° C. to 220° C. is preferably used, with the possibility of using other temperatures higher than the release coat activation temperature. The label is preferably used on PET, PE, and PP packs, among others.

It was noted that the label offers excellent chemical resistance, withstanding thirty 30-minute cycles with the packaging immersed in a tank holding a solution of 2% to 5% m/m of sodium hydroxide, at a temperature between 55° C. and 65° C. The label also withstood a five-hour cycle with the packaging immersed in a tank holding a solution of 2% to 5% m/m.

Within the system proposed in the present invention, the protective layer is applied and dried in the protection application module, the at least one identification layer is applied and dried in the identity module, the thermal transfer printing is performed in the thermal transfer module, and the adhesive is applied and dried in the adhesive application module. The system may also comprise a second identity module, wherein additional identification layers may be applied, after the thermal transfer printing, for example.

The drying steps may take place in kilns positioned after each printhead, with the use of temperature. The kiln temperatures are preferably set between 52° C. and 65° C. In one embodiment, the adhesive varnish drying temperature is higher than the protective varnish drying temperature. In one embodiment, different identification layers may be dried at different temperatures.

It is important to stress that the Figures and Specification presented do not limit the ways of implementing the inventive concept set forth herein, but rather illustrate and ensure a good understanding of the conceptual innovations disclosed in this solution. The descriptions and images must be interpreted in an illustrative rather than a constrictive manner, with other equivalent or analogous ways of embodying the inventive concept disclosed herein, that are not beyond the range of protection outlined in the proposed solution.

This Specification defines a novel manufacturing system and method for manufacturing labels with variable information printed by thermal transfer, being endowed with Novelty, an Inventive Step, Sufficiency of Disclosure, and Industrial Applicability whereby it complies with all the essential requirements for granting the privilege as claimed.

The invention claimed is:

1. A manufacturing process for labels with variable information through thermal transfer printing comprising the following steps:

providing a support strip comprising a substrate and a release coat arrayed on the substrate surface;

applying a layer of protective varnish on the support strip;

drying the protective varnish layer;

applying at least one identification layer on a region of the protective varnish layer, forming at least one label;

drying the at least one identification layer of the at least one label;

providing, in a subsequent step after formation of said at least one label, a strip-type ribbon for thermal transfer printing of variable information on each of the at least one label on the said strips containing the labels;

printing variable information on each of the at least one label through thermal transfer;

applying a layer of adhesive varnish on the preceding layers;

drying the adhesive varnish layer;

wherein said protective varnish is a copolyester varnish; the said printing of variable information takes place through thermal transfer at a temperature at or below 30° C.; and the printing speed of the strips containing the labels is between 0.25 and 1.2 m/s.

2. The manufacturing process according to claim 1, wherein said step providing a support strip comprising a substrate and a release coat comprises: providing the support strip comprising a substrate; depositing a release coat on the said substrate through a rotogravure process; and drying the said release coat.

3. The manufacturing process according to claim 1, wherein said adhesive varnish layer has a thickness of 1 to 5 microns.

4. The manufacturing process according to claim 1, wherein the printing of the protective varnish layers, the identification layers, and adhesive varnish layer is performed on a rotogravure press.

5. The manufacturing process according to claim 1, wherein the release agent is a polyethylene wax at a temperature between 58° C. and 95° C.

6. The manufacturing process according claim 1, wherein said thermal transfer printing is performed through contact between at least one printhead and the strip-type ribbon, wherein the contact between the strip-type ribbon and at least one of the labels, wherein the printhead is reset between each printing operation, thus printing the variable information on each label.

7. The manufacturing process according to claim 1, wherein the ribbon is wax/resin type.

8. The manufacturing process according to claim 1, further comprising the application of at least one additional identification layer before applying the adhesive varnish layer.

9. The manufacturing process according to claim 1, wherein the identification layer, before applying the variable information serves as a guide for the printhead to transfer said variable information.

10. The manufacturing process according to claim 1, wherein said variable information is the identification code of a Data Matrix or QR Code type label.

11. The manufacturing process according claim 1, wherein said drying of the protective varnish layer, drying the at least one identification layer, and drying the adhesive varnish layer takes place in one or more kilns positioned downstream from the corresponding printheads, with temperature settings between 52° C. and 65° C.

12. A manufacturing system for labels with variable information through thermal transfer printing comprising:

a protection application module;

an identity module;

a thermal transfer module;

an adhesive application module;

wherein the said identity module is connected downstream from the protection application module;

wherein the said thermal transfer module is connected downstream from the identity module;

wherein the said adhesive application module is connected downstream from the thermal transfer module;

wherein a support strip comprising a substrate and a release coat arrayed on the surface of the said substrate is received in the protection application module, wherein applying and drying takes place of a layer of protective varnish;

wherein the support strip then continues to the identity module, wherein applying and drying takes place of at least one identification layer on the protective varnish layer, forming at least one label;

wherein the support strip then continues to the thermal transfer module, wherein the variable information is printed on each label from a strip-type ribbon, guided by the positioning of the identification layer;

wherein the support strip then continues to the adhesive application module, wherein applying and drying takes place of at least a layer of adhesive varnish on the preceding layers;

wherein the said protective varnish is a copolyester varnish;

the said printing of variable information is performed at a temperature at or below 30° C.; and the printing speed of the strips containing labels is between 0.25 and 1.2 m/s.

13. The system according to claim 12, further comprising a second identity module between the thermal transfer module and the adhesive application module, wherein at least one additional identification layer is applied to each label, before applying the adhesive varnish layer.

14. The system according to claim 12, wherein said drying of the protective varnish layer, drying the at least one applied to identification layer, and drying the adhesive varnish layer takes place in one or more kilns positioned downstream from corresponding printheads, with temperature settings between 52° C. and 65° C.

* * * * *